United States Patent [19]

Heinze et al.

[11] 4,082,659

[45] Apr. 4, 1978

[54] PROCESS FOR CONCENTRATING LATICES

[75] Inventors: Christoph Heinze, Burghausen, Salzach; Kasimir Ruchlak, Burgkirchen, Alz; Holm Steude, Emmerting, all of Germany

[73] Assignee: Hoechst Aktiengesellschaft, Frankfurt am Main, Germany

[21] Appl. No.: 741,042

[22] Filed: Nov. 11, 1976

Related U.S. Application Data

[63] Continuation of Ser. No. 571,227, Apr. 24, 1975, abandoned.

[30] Foreign Application Priority Data

Apr. 30, 1974 Germany .............................. 2420922

[51] Int. Cl.$^2$ ...................... B01D 13/00; C08F 14/06
[52] U.S. Cl. ..................................... 210/23 F; 526/344;
528/486; 528/487
[58] Field of Search ............... 260/29.6 R; 210/321 R, 210/23 F; 526/344; 528/486, 487, 502, 480

[56] References Cited

U.S. PATENT DOCUMENTS

| | | | |
|---|---|---|---|
| 3,198,773 | 8/1965 | Stoloff | 526/344 X |
| 3,208,965 | 9/1965 | Kuhne | 526/344 X |
| 3,226,350 | 12/1965 | Smith | 526/344 X |
| 3,519,558 | 7/1970 | Cooper | 210/23 |

OTHER PUBLICATIONS

Michaels, A. S., New Separation Technique for the CPI, Chem. Eng. Progress, 64, 1968, pp. 31-43.

*Primary Examiner*—Christopher A. Henderson
*Attorney, Agent, or Firm*—Connolly and Hutz

[57] ABSTRACT

The present invention is related to the process of concentrating K-polymer-latices by ultra filtration carried out by means of a semi-permeable membrane made of a synthetic polymer having a determined molecular weight, comprising that the membrane is pretreated with an emulsifier solution prior to ultra filtration. This operation substantially prevents the formation of solid matter deposits on the membrane.

3 Claims, No Drawings

PROCESS FOR CONCENTRATING LATICES

This application is a continuation of application Ser. No. 571,227 filed Apr. 24, 1975 now abandoned.

The present invention is related to a process for the concentration of latices which are obtained by emulsion-polymerizing vinyl chloride or vinyl chloride and monomers copolymerizable herewith, carried out by ultra filtration by means of a semi-permeable membrane made of a synthetic polymer.

Upon emulsion-polymerizing vinyl chloride or vinyl chloride and monomers copolymerizable therewith a latex is formed which contains in addition to the hydrosoluble polymerization agents such as emulsifiers and activators up to 50 weight % of polymer, calculated on the weight of the latex. In some cases it is necessary or at least desirable to concentrate such latices. For certain application purposes it is useful to further concentrate the latices, for example as bonding agent. When working the latices up to yield a powdery polymer, usually by a drying process, e.g. by spray drying, a process which requires the evaporation of the total quantity of water, economical reasons recommend the further concentration of the original latices to a rate of up to 70 weight % of the polymer.

It is known to carry out the concentration by means of a vacuum evaporator or a film evaporator. However, the concentration of latices based on polyvinyl chloride by means of a vacuum evaporator or a film evaporator is problematic, because such latices - as generally known - are more or less sensitive to temperature and, besides, tend to foaming, a fact which hampers the evaporation. Furthermore, local overheating in the evaporator may encrust the evaporator, these crusts may peel off the evaporator walls and appear in the latex as undesirable granulated deposit.

It has also been proposed to carry out the concentration of the emulsion-polymer latices by ultra filtration by means of semi-permeable membranes made of synthetic polymers ("Chemical Engineering Progress", vol. 64, 1968, no. 12, pg. 31 – 43 and "Chemie-Anlagen + Verfahren", 1971, no. 8, pg 52, 57 and 58). However, the practical realization of this method failed hitherto due to the fact that after a short operation period the above mentioned relatively high contents in polymer (up to about 50 weight %) of the latices obtained by emulsion-polymerization show an effect known as concentration polarization of semi-permeable membranes. The described effect is indicated by clogging of the membrane pores after merely a short filtration period and by encrusting of the entire membrane surface with a solid material so that the filtration gets gradually more and more difficult and finally impossible.

Object of the present invention is therefore to offer a process which avoids these disadvantages.

The present invention solved this problem by a process for the concentration of latices which are obtained by emulsion-polymerizing vinyl chloride or vinyl chloride and monomers copolymerizable therewith, by ultra filtration by means of a semi-permeable membrane made of a synthetic polymer, the improvement comprising the use of a semi-permeable membrane with a partition cut at a molecular weight of from 5 000 to 100 000, this membrane being treated prior to ultra filtration with an aqueous solution of one or more emulsifiers which are suitable to emulsion-polymerizing vinyl chloride or vinyl chloride and monomers copolymerizable therewith.

Actually, suitable membranes for the process according to the invention are all membranes made of synthetic polymers, provided they have a sufficient chemical stability in respect to the latex to be filtered. The following well known membrane materials may be cited i.a.: polyacrylic acid, polystyrene, styrene-copolymers, sulfonated polyphenylene oxides, cross-linked polyvinyl alcohols, polyolefins such as polyethylene, polypropylene and ethylene-copolymers, vinylchloride - copolymers, polyacrylonitrile, polyvinylene-carbonate, polyvinylene glycol, polyacrylates such as polyethyl acrylate e.g. cross-linked with trimethylolpropane-trimethacrylate and polymethylmethacrylate, e.g. poly-(galactosemethacrylate)methylmethacrylate, polyimides, polyvinyl pyrrolidones, e.g. cross-linked with methylene-bis-(4-phenylisocyanate), polyimidazopyrrolones, e.g. pyrromellithic acid dianhydride-3,3'-diaminobenzidine, polyamides, e.g. polycaprolactam cross-lined with toluene-2,4-diisocyanate, polyamide hydrazides as well as membranes based on cellulose, such as cellulose-acetate membranes, celluloseacetate-palmitate membranes and cellulose nitrate membranes. Such membranes can be prepared for example according to U.S. Pat. Nos. 3,133,132, 3,651,030, 3,710,945 and 3,737,042. Especially suitable proved to be membranes of polyacrylonitrile, polyamides as well as of polymethyl-methacrylate. As far as the structure of the membranes is concerned, known asymmetric membranes are used preferably. Such asymmetric membranes may consist e.g. of a thin (about 0.1 to 2 $\mu$m thick) partition layer and a highly porous substructure of the same material as support for the partition layer which can be achieved by known manufacturing processes through different precipitation conditions of the polymer. There may also be used asymmetric membranes consisting of a dense but extremely thin (about 400 to 2000 A thick) polymer film which had been spread onto a mechanically stable micro-porous support.

The ultra filtration of the latices is carried out in such a way that the membranes are positioned according to known membrane sets (moduli) or assembled to an apparatus. Plate moduli are used which normally group several flat membranes (platen membranes) to form a package. Also suitable moduli are tubular moduli composed of bundles of perforated metal tubes each of which being lined with a tubular membrane on a porous support, or spiral shaped moduli of wound spiral membranes. When using platen membranes and wound spiral membranes the distance separating two membranes should usefully vary from 2 to 20, preferably from 3 to 8 mm. When using tubular membranes the most suitable tube diameter varies from 10 to 50, preferably from 15 to 25 mm.

The ultra filtration membranes are characterized by the definition of "partition cut" which indicates the minimum limit of the molecular weight of macromolecules being still retained by the membrane.

Membranes with a partition cut at a molecular weight of from 5000 to 100 000, preferably with a partition cut at a molecular weight of from 10 000 to 50 000 are used for the concentration of latices.

As per the invention the membrane materials are treated, prior to their use for ultra filtration, with the aqueous solution of one or more emulsifiers such as they are suitable for the emulsion polymerization of vinylchloride or of vinylchloride and monomers copolymerizable herewith. Such emulsifiers suitable for emulsion-polymerizing vinylchloride which may be considered for the pretreatment are, for example, alkyl sulfonates and alkyl sulfates having from 8 to 20 carbon atoms, preferably from 12 to 18 carbon atoms, such as lauryl sulfate; alkylaryl sulfonates, the alkyl radicals of which have totally from 8 to 18 carbon atoms, such as dodecylbenzene sulfonate, dibutyl naphthalene sulfonate, octadecylbenzene sulfonate; salt of higher fatty acids have from 8 to 22 carbon atoms, such as stearic acid, lauric acid, palmitic acid; salts of fatty acids containing epoxy groups, such as epoxystearic acid; salts of acid phosphonic acic alkyl ester, aryl ester or alkylaryl ester, the alcoholic or phenolic components of which have from 6 to 18 carbon atoms, such as diethylhexyl phosphonic acid; oxyalkyl sulfonic acids having from 8 to 18 carbon atoms in the alkyl chain and having from 1 to 15 alkylene oxide radicals, each radical having from 2 to 3 carbon atoms, or their salts; sulfo-phthalic acid esters having from 4 to 12 carbon atoms in the alcohol component or their salts; sulfosuccinic acid esters or their salts and polyalkylene oxide derivatives of phenols or amides. As salts may be considered in general the alkali metal salts, alkali earth metal salts and ammonium salts, preferably alkali metal salts or ammonium salts. Respecting further emulsifiers reference is made to F. Kainer, "Polyvinylchlorid and Vinylchloridmischpolymerisate" 1965, p. 36 – 44. Especially proved to be the ammonium salts or alkali metal salts of the sulfo succinic acid diesters, the alcohol component of which is an alkyl radical, preferably branched, having from 5 to 15 carbon atoms, preferably from 8 to 12 carbon atoms. The same emulsifier can be used for the pretreatment of the membrane and for the emulsion-polymerization of the latex to be filtered, or it is also possible to use a different emulsifier of the afore described groups, or their mixtures.

The pH of the treatment solution is not of critical importance. It has to be adjusted in such a way that the membrane material is spared, the operations are generally carried out at pH values ranging from 4 to 10.

According to the invention a solution, preferably an aqueous solution, is prepared of the emulsifier or of the emulsifier mixture containing from 0.5 weight % to 70 weight % of emulsifier, preferably from 0.5 to 40 weight %, especially from 1 to 10 weight %.

Prior to their use for ultra filtration the membranes are put in contact to these solutions for at least half an hour, preferably for a period of from half an hour to 48 hours, especially from 10 to 30 hours, for example by immersing the membranes in a vessel with the emulsifier solution. It is useful to treat the support material of the membranes at the same time. The temperature at which the emulsifier treatment is carried out has its lower limit set by the freezing point of the emulsifier solution and its upper limit by the heat resistance temperature of the chosen membrane material. Generally, it is possible to operate at about from 0° C to about 80° C, the treatment is preferably carried through at temperatures from 20° to 50° C.

So as to keep small the stagnant partition layer at the membrane, the flow speed of the latex along the membrane set should be at least 0.5 m per second, preferably a speed of from 0.5 to 5 m per second should be chosen, especially from 2 to 3 m per second. The upper limit of the speed is given by pressure loss and shear gradient. The filtring pressure is from 0.1 to 6 bar, preferably from 0.5 to 2 bar, above the pressure on the filtration product face. In a preferred embodiment the latex to be concentrated is directed in a circulation movement.

The process according to the invention substantially prevents the formation of solid deposits on the membrane, but it does not succeed in avoiding it entirely. However, the thin covering which is forming on the membrane has a soft and fluffy consistency and can be rinsed off easily with water; this covering does not clog the membranes in any way or encrust the surface of the membranes, such as it occurred in the past as a consequence of the concentration polarization. When it is desirable to carry out the process of the invention continuously, the membrane should be separated from the latex in intervals of from about 24 to 240 hours of ultra filtration period and rinsing with water should take place in the opposite direction to the latex flow, the flow speed of the water should be at least 0.5 m per second. The thin and fluffy covering of the membrane is rinsed off in a few minutes and the ultra filtration process can be continued. If the permeability of the membrane should abate after a prolonged filtering period, a repition of the pretreatment of the membrane as per the invention is recommended.

The process according to the invention offers a simple method for concentrating continuously aqueous latices which are formed upon emulsion polymerization of vinylchloride or of vinylchloride and up to 40 weight %, preferably from 1 to 20 weight % - calculated on the total monomers - of monomers copolymerizable herewith, so that polymer contents of up to 80 weight % are attained. By copolymerization is to comprise also the graft polymerization - the graft polymers should contain at least 70 weight %, preferably at least 80 weight % - calculated on the graft polymer - of vinylchloride units. Suitable monomers are olefinically unsaturated compounds such as they are described by U.S. Pat. Nos. 3,663,520 and 3,691,080, especially vinyl esters of straight-chain or branched carboxylic acids of from 2 to 20, preferably from 2 to 4 carbon atoms, e.g. vinyl acetate, vinyl propionate, vinyl butyrate, vinyl-2-ethylhexonate, vinyl fumarate, vinyl stearate; viny ethers such as vinyl methyl ether, vinyl dodecyl ether; furthermore unsaturated monocarboxylic acids such as crotonic acid, acrylic acid, methacrylic acid and the corresponding esters with alcohols of from 1 to 10 carbon atoms, e.g. methyl ester, butyl ester or octyl ester; moreover, unsaturated dicarboxylic acids such as maleic acid, fumaric acid, itaconic acid, their anhydrides, imides and esters (the latter with alcohols having from 1 to 10 carbon atoms). Further useful comonomers are acrylonitrile, aromatic vinyl monomers such as styrene; α-olefins such as ethylene, propylene or butylene; vinylidene halides, e.g. vinylidene chloride. For carrying out the graft polymerization there may be used especially diolefins such as butadiene, chloroprene and cyclopentadiene. The monomers are used as such or as mixtures of each other.

Concentrated latices are needed as such for many purposes, especially for coating. If they are subject to a further treatment such as a drying process, e.g. spray drying, much less energy is needed, since a smaller quantity of water has to be evaporated.

The process according to the invention includes a further advantage. Namely, the specified latices usually contain also solutions of various low-molecular auxiliary materials such as emulsifiers, activators, buffer substances which are used for the polymerization. Generally, the emulsifiers are the same as those specified page 5, par. 4. When polymerizing the latices there may be used e.g. from 0.001 to 3 weight %, preferably from 0.1 to 0.3 weight %, calculated on monomers of radical-forming activators, for example persulfates such as potassium persulfate, sodium persulfate or ammonium persulfate, hydrogen peroxide, tert.-butyl hydroperoxide, cyclohexanone peroxide or other hydrosoluble peroxidic compounds such as perborates, percarbonates, perphosphates as well as mixtures of various activators, these activators may also be used in the presence of from 0.01 to 1 weight % - calculated on monomers - of one or several reducing agents which are suitable for building up a redox-catalyst system, such as sulfites, bisulfites, dithionites, thiosulfates, aldehyde-sulfoxylates, e.g. formaldehyde-sulfoxylate, ascorbic acid. The polymerization may possibly be carried through in the presence of from 0.05 to 10 ppm - calculated on metal per monomers - of soluble metal salts, e.g. of copper, of silver, of iron or of chromium. When using the membranes submitted to a pretreatment according to the invention, it is possible to separate from the polymer a part of the low-molecular substances. This may be important for the quality of the product. For example, polymers for foodstuffs wrapping material and for more transparent sheets should preferably contain a reduced rate of an emulsifier. Furthermore it is possible to recycle into the polymerization the auxiliary materials being recovered in the filtration process.

The process according to the invention is not strictly limited to the concentration of said latices, but it may also be applied for emulsion polymer latices made of other monomers, e.g. of vinylidene chloride, vinyl acetate and mixtures of these monomers of these monomers of each other and with other copolymerizable monomers.

The following examples illustrate the invention:

EXAMPLE 1

A vessel contains 40 m$^3$ of a polyvinyl chloride latex which was prepared continuously by emulsion polymerization, containing 45 weight % of solid matter and having a K-value of the polymer of 54. 70 m$^3$ of latex per hour were circulation-contacted by means of a pump with a membrane of polymethylmethacrylate having a size of 12m$^2$ and being constructed asymmetrically such as it is commercially available. The partition cut of this membrane is at a molecular weight of 24 000. The membrane is bonded on both sides on 30 platens of a porous support fabric of 120 mm height and 1700 mm length. The distance from one platen to the next was 3 mm, the flow speed of the latex between the platens was 1,80 m/sec. Prior to its first use the membrane was immersed for 12 hours in a solution of 5 weight % of di-isodecyl-sulfosuccinic acid ester (Na salt) in water. The filtration pressure of the latex in the ultra filtration device was adjusted to 2.5 bar by means of a throttle, the filtrate could escape freely flowing without counter-pressure. The yield per hour was 52 l of filtrate during the first 24 hours, after further 24 hours the filtration output fell to 45 l/h. The feeding of latex to the membrane was interrupted after 120 hours. Visual inspection of the membrane at that moment showed a soft polyvinyl chloride covering which could be removed easily by rinsing with water. The membrane was then rinsed for two minutes with 1 m$^3$ of water in the opposite direction to the latex flow. Subsequently, the apparatus was again fed with latex as per the above mentioned description. The filtration output was again 52 liters per hour. At the end of about 10 days the solid matter contents of the latex had increased from 45 weight % to 60 weight %. The filtration product was clear and contained 0.5 weight % of dissolved auxiliary materials but no polyvinyl chloride. Even after 10 days the membrane was covered with a thin, soft layer of polyvinyl chloride only which could be easily removed by rinsing with water. The latex concentrated to 60 weight % of solid matter was dried in a spray drying device to yield polyvinyl chloride powder. The discharge of solid matter was more than twice the discharge obtained upon drying the non pre-concentrated latex, at the same evaporation capacity of the drying device.

EXAMPLE 2

The latex obtained according to example 1 containing 60 weight % of solid matter was subject to further concentration in the apparatus described by example 1. A reduced filtration output of 36 l/h was determined. After a treatment of about 120 hours the latex contained 70 % of solid matter. This latex was still capable of being pumped and sprayed in the spray drying device. At the same evaporation capacity of the dryer the solid matter discharge was about three times higher than the rate obtained by spraying the initial latex obtainable by polymerization and containing about 45 % of solid matter. Despite the prolonged treatment period the polyvinyl chloride covering of the membrane was not thicker than the one described by example 1.

EXAMPLE 3

A vinylchloride graft polymer latex prepared by continuous emulsion polymerization of 92 parts of vinylchloride, 7 parts of butadiene and 1 part of acrylonitrile, containing 45 weight % of solid matter and having a K-value of the polymer 60, is concentrated in a tubular membrane (so-called tubular module) at an inside diameter of 24 mm and a length of 3000mm. The membrane of the tubular module consists of polyamide and has a partition cut at a molecular weight of 40 000 (numerical average).

Prior to be put to use the membrane is immersed in a 3% aqueous solution of a sodium alcane sulfonate for 10 hours at 20° C. This alcane sulfonate has the following chain length distribution: up to $C_{14}$: 9 weight %, $C_{14}$: 27 weight %, $C_{15}$: 34 weight %, $C_{16}$: 22 weight %, above $C_{16}$: 8 weight %. Approximately one fifth of all alkanes is bi-sulfonated. The latex pressure in the membrane is 3 bar, the flow speed of the latex is 2 meters per second. The measured filtration output is 3 l of filtrate per m$^2$ of membrane surface and hour. The latex is concentrated up to 50 weight % of solid matter. After 100 days of continuous operation, while the spraying recycle is carried out according to the description of example 1, the tubular membrane is merely covered with a thin soft layer of polyvinyl chloride which can be easily removed by rinsing with water.

EXAMPLE 4

A vinyl chloride copolymer latex containing 35 weight % of solid matter and having a K-value of the polymer of 70 and which is prepared by continuous emulsion polymerization of 95 parts of vinyl chloride and 5 parts of vinyl acetate is concentrated in the same apparatus as per the description given by example 1. Prior to its use the membrane of the apparatus had been treated for 12 hours at about 20° C with an aqueous 5 weight % solution of the sodium salt of diisodecyl-sulfosuccinic acid ester. The filtration pressure of the latex is adjusted to 2,7 bar, the filtrate can escape freely flowing without counter-pressure. The filtration output is 95 liters per hour. A descreasing filtration output could not be observed until the desired final rate of solid matter contents, namely 45 weight %, was achieved. The apparatus is operated continuously for 100 days, while the same spraying recycle as described by example 1 is carried out. At the end of this period the membrane is merely covered with a thin soft polyvinyl chloride layer which can be easily removed by rinsing with water.

What is claimed is:

1. In a process for concentrating latices which are prepared by emulsion polymerization of vinyl chloride or of vinyl chloride and monomers copolymerizable with vinyl chloride by ultrafiltration by means of a semipermeable membrane of polyacrylonitrile, polymethylmethacrylate or polyamide having a partition cut at a molecular weight of from 10,000 to 50,000, the improvement which comprises the treatment of the membrane, prior to the ultrafiltration, with an aqueous solution having 0.5 to 70 weight % of one or more emulsifiers which are suitable for the emulsion polymerization of vinyl chloride or of vinyl chloride and monomers copolymerizable with vinyl chloride.

2. Process according to claim 1 which comprises the immersion of the membrane in an aqueous solution which contains from 1 to 10 weight % of emulsifier for a period of from half an hour to 48 hours.

3. Process according to claim 1 which comprises the use of an ammonium salt or an alkali metal salt of a sulfosuccinic acid diester as emulsifier, the alcohol component of which is a branched alkyl radical having from 8 to 12 carbon atoms.

* * * * *